United States Patent [19]

Jones, Jr. et al.

[11] 4,187,767
[45] Feb. 12, 1980

[54] DIESEL CYLINDER HEAD AND LINER

[76] Inventors: Robert H. Jones, Jr.; Richard B. Jones, both of 1321 E. 39th St., Hibbing, Minn. 55746

[21] Appl. No.: 833,497

[22] Filed: Sep. 15, 1977

[51] Int. Cl.² .............................................. F16J 11/04
[52] U.S. Cl. .................................... 92/171; 123/41.83
[58] Field of Search ......................... 92/169, 171, 170; 123/193 C, 193 CH, 193 CD, 41.83, 41.84; 254/104

[56] References Cited

U.S. PATENT DOCUMENTS

| | | | |
|---|---|---|---|
| 980,518 | 1/1911 | Harley | 92/171 |
| 1,792,201 | 2/1931 | Treiber | 123/41.83 |
| 2,127,825 | 8/1938 | Mader . | |
| 2,168,131 | 8/1939 | Mader | 92/171 |
| 2,282,502 | 5/1942 | Suth | 92/171 |
| 2,488,804 | 11/1949 | Christensen . | |
| 2,547,789 | 4/1951 | Skeel | 254/104 |
| 2,701,743 | 2/1955 | Mattingly . | |
| 2,786,425 | 3/1957 | Yarbough . | |
| 2,963,984 | 12/1960 | Rogers . | |
| 2,981,575 | 4/1961 | Leman . | |
| 3,137,216 | 6/1964 | Aytes . | |

FOREIGN PATENT DOCUMENTS

| | | | |
|---|---|---|---|
| 301976 | of 1928 | United Kingdom | 92/171 |
| 1137191 | 12/1968 | United Kingdom | 92/169 |

*Primary Examiner*—Paul E. Maslousky
*Attorney, Agent, or Firm*—James A. Geppert

[57] ABSTRACT

A cylinder head and liner assembly for use in a diesel engine wherein the inner end of the cylinder liner is accurately and positively adjusted within the bore in the diesel engine block for maximum efficiency in alignment of the liner relative to the piston reciprocating therein, the adjustment being accomplished through a series of manually movable adjustable wedges that are circumferentially spaced around the liner and provide inclined surfaces cooperating with the liner exterior surface and the internal surface of the bore in the crankcase.

10 Claims, 7 Drawing Figures

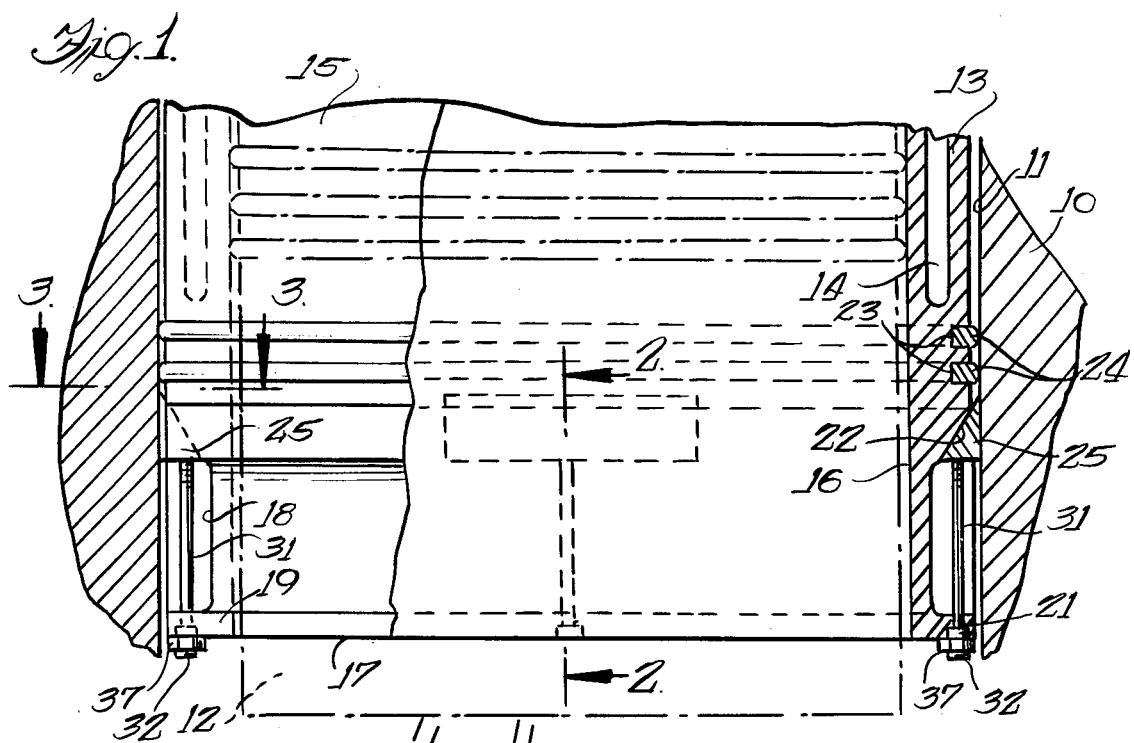
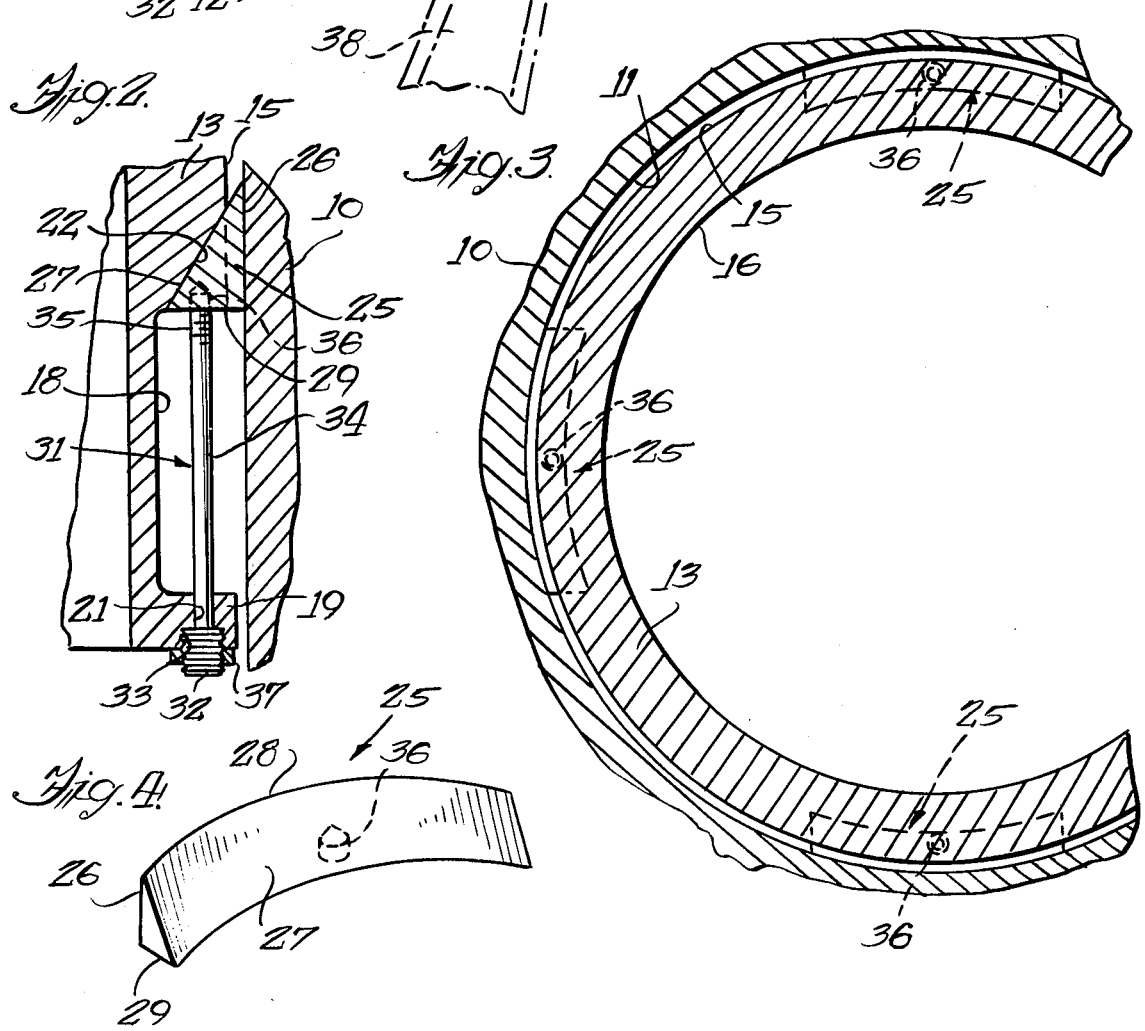

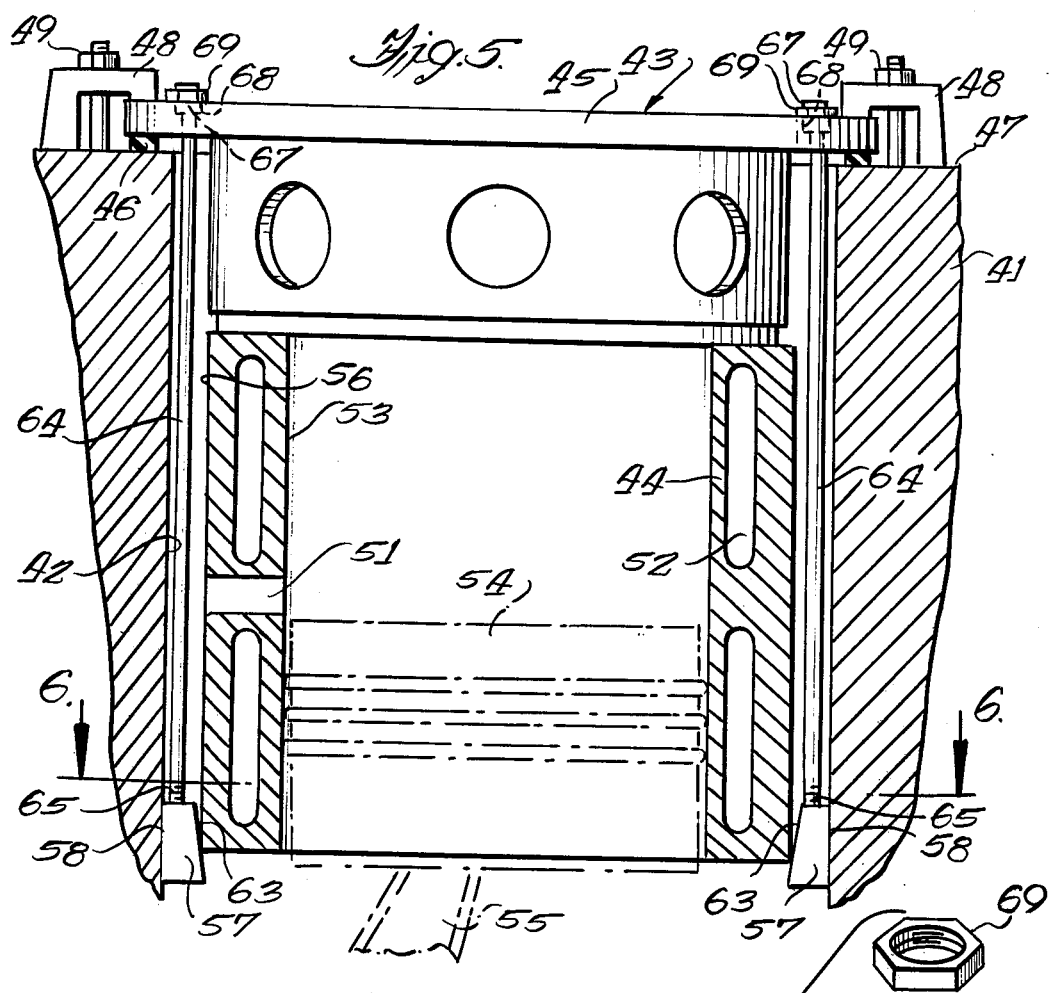
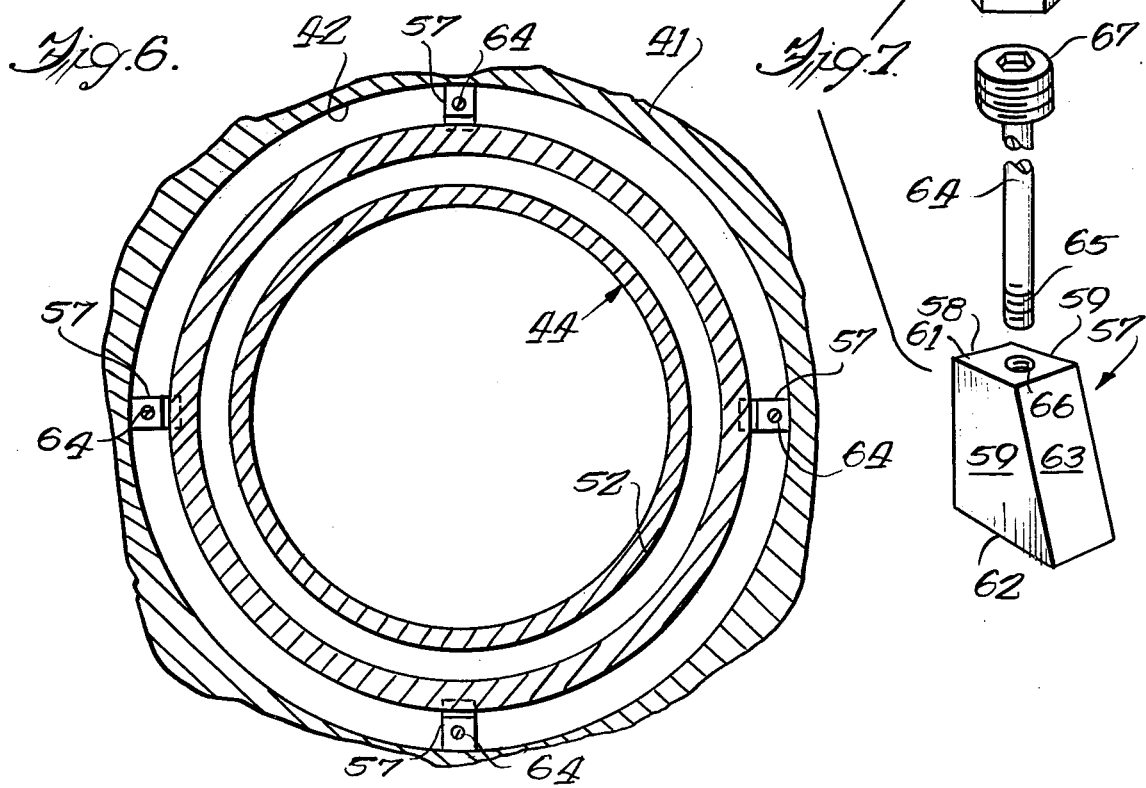

DIESEL CYLINDER HEAD AND LINER

BACKGROUND OF THE INVENTION

In diesel engines, especially the large engines utilized in locomotive engines for railroads, the engine block has a series of bores forming the cylinders in the engine adapted to receive the reciprocatory pistons operatively connected to the crankshaft. As the engines increase in size, the bores for the cylinders become less accurate in the machining of parts of this size, and it has become necessary to provide a cylinder liner in the bore to provide the finished interior surface within which the piston reciprocates during the combustion cycle to provide rotation of the crankshaft. Such a liner is suitably secured to a cylinder head that is mounted on the engine block, which whole assembly is secured to the block by crab blocks. A bore is machined into the block with sufficient clearance for assembly. Thus, the cylinder liners can and do have oscillating movement during operation of the engine.

The problem with the use of clyinder liners is that there is no presently known method of firmly and accurately holding the inner edge of a cylinder liner in the bore of a large engine block. The problem arises and is caused by the forces occurring during the reciprocating movement of the piston pivotally mounted on a connecting rod, which in turn is operatively connected to an offset portion of a rotating crankshaft. The thrust of the crankshaft or piston during its reciprocation in the cylinder liner also produces side-to-side forces acting on the cylinder liner and the cylinder head which results in failure of the top flange of the cylinder head or the block immediately surrounding the head. Because of the necessary clearances and tolerances involved in the cylinder bore, the cylinder liner and any insert, a constant working motion on the liner is observed due to the side thrust caused by the crankshaft. The present invention provides an alignment and retaining arrangement to ameliorate this problem.

SUMMARY OF THE INVENTION

The present invention comprehends a method and arrangement for retaining and accurately aligning the lower end of a cylinder liner in a diesel engine block to eliminate the constant side-to-side motion caused by the motion of the crankshaft acting through the connecting rod and piston to exert a side thrust on the liner. This alignment and retention is accomplished through the use of a series of wedges or blocks cooperating with inclined surfaces formed on the exterior surface of the liner, the wedges being positioned between the inclined surfaces and the interior surface of the cylinder bore.

The present invention also comprehends the provision of aligning wedges or blocks that may be easily and manually adjusted. Where the diesel cylinder block is of such a size as to allow a person's hand to be received in the crankcase containing the bore receiving the crankshaft, a series of bolts have threaded engagement with the wedges and extend through a flange at the lower edge of liner where the head of the bolt or cap screw can be manually manipulated by the person's hand through the inspection holes in the crankcase while he can see them through the inspection holes.

The present invention further comprehends the provision of aligning wedges or blocks mounted adjacent the lower end of the cylinder and adjusted from the exterior upper surface of the cylinder head. In this embodiment, an elongated bolt or cap screw extends through the cylinder head and either through a portion of the cylinder liner or the space between the liner and the bore to threadingly engage the wedge so that rotation of the exposed head of the bolt will cause adjustment of the internally hidden wedge.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a cross-sectional view through a diesel cylinder and liner therefore, with the liner shown partially in elevation, and showing one form of the present invention.

FIG. 2 is an enlarged cross-sectional view of the positioning wedge for the liner and cylinder taken on the line 2—2 of FIG. 1

FIG. 3 is a cross-sectional view taken on the line 3—3 of FIG. 1

FIG. 4 is an enlarged perspective view of the positioning wedge.

FIG. 5 is a cross-sectional view of a diesel cylinder and liner, with the cylinder head shown in elevation, showing an alternate embodiment of positioning wedge.

FIG. 6 is a cross-sectional view taken on the line 6—6 of FIG. 5.

FIG. 7 is an exploded perspective view of the positioning wedge and tightening means.

DESCRIPTION OF THE PREFERRED EMBODIMENTS

Referring more particularly to the disclosure in the drawings wherein are shown illustrative embodiments of the present invention, FIG. 1 discloses a portion of a diesel cylinder block 10 for a diesel engine of the size utilized for a locomotive to drive a passenger or freight train. In diesel engines of such large sizes, a cylinder bore of sufficient accuracy so as to accurately receive a reciprocating piston in a proper working relationship therein is not easily accomplished. Furthermore, due to both the vertical reciprocation as well as the side-to-side thrust caused by rotation of the crankshaft and imparted to the piston by the piston rod, wear of the cylinder walls becomes an important factor which may cause a lengthy down-time for the engine.

Rather than attempt to provide cylinder bores of the accuracy required, a cylinder bore 11 is formed oversize to the diameter of the piston 12, shown in dotted lines, and a cylinder liner 13 is suitably secured to the cylinder head (not shown) and is received in the bore 11 to slidably receive the reciprocating piston 12. The liner is formed with suitable water cooling passages 14 and such ports as may be necessary to be aligned with corresponding ports in the cylinder wall (see FIG. 5). The main body of the liner is generally cylindrical with an exterior wall 15 of a diameter slightly less than the diameter of the cylinder bore 11 and an interior cylindrical surface 16 to receive the piston.

The lower end 17 of the liner is provided with a reduced diameter portion 18 terminating in a radial flange 19 having several counterbored openings 21 therethrough. At least partial conical surfaces 22 are formed on the wall 15 to provide the transition between the surface 15 and the portion 18, although a continuous conical surface 22 may be utilized, and spaced above the surfaces 22 are one or more annular grooves 23 to receive suitable sealing rings 24. Circumferentially equally spaced around the liner 13 in alignment with surfaces 22 are three or four adjustment wedges 25 formed of a suitable material, such as a SAE 4340 steel, to adjust and accurately position the liner 13 in the cylinder bore 11 to provide maximum concentricity with respect to the axis of the piston. Each wedge has an arcuate outer surface 26, an arcuate inner surface 27 that is outwardly inclined to intersect the surface 26 in an upper edge 28, and a flat annular lower surface 29. An adjustment screw 31 has an enlarged exteriorly threaded head 32 received in the unthreaded counterbore 33 of an opening 21 and an elongated shank 34 with a threaded end 35 received in a threaded opening 36 in the base surface 29 of the wedge 25. A locknut 37 threadedly engages the threaded head 32 to retain the screw in adjusted position.

The problem created by the use of cylinder liners 13 is caused by the thrust of the crankshaft transmitted through the connecting rod 38 and the reciprocating piston 12. The thrust provides a side-to-side motion on the cylinder liner 13 and the cylinder head (seen in FIG. 5) at the upper end of the bore, which causes failure of the top flange of the head or of the block around the head. There appears to have been no previously known effective means of firmly holding the bottom edge of the cylinder liner to eliminate the constant working motion due to the side thrust caused by the necessary clearances and tolerances between the liner and the cylinder bore.

The use of the three or four wedges 25 overcomes and solves this problem of retaining the lower end of the liner stationary. To clamp the liner in position, the wedges are positioned on the liner in a lowered or retracted position, the liner and cylinder head are secured together and inserted into the bore, and the screws 31 are rotated to urge the wedges 25 upward so that the inclined surfaces 27 engage the inclined or conical surfaces 22 on the liner with the arcuate outer surface 26 forced into frictional clamping engagement with the cylinder bore 11. In diesel engines utilized in locomotives, the cylinder block is of such a size that a person can position at least a portion of his body in the block, when the crankshaft is removed, and gain access to the lower ends of the liners. Thus, a person can manually rotate the screws 31 through an Allen wrench engaging the suitable socket in the head 32 to seat the wedges for each liner, and the locknuts turned to engage the flange 19 to retain the screw in adjusted position.

FIGS. 5 through 7 disclose an alternate embodiment of adjustment wedges where access cannot be obtained to the interior of the cylinder block 41. The block is provided with a generally cylindrical bore 42 to receive the cylinder head 43 and the cylinder liner 44 secured thereto. The cylinder head has an upper radial flange 45 which is positioned on a sealing ring 46 on the top surface 47 of the block, and the flange is clamped by several crab blocks 48 secured by crab bolts and nuts 49 in the engine block. The cylinder liner 44 is suitably secured to the head, such as by conventional studs extending into and through the cylinder head.

The cylinder liner 44 has the conventional air inlet ports 51 and water jacket 52, and has both a cylindrical inner surface 53 to receive a piston 54 on a connecting rod 55 (both shown in dotted lines) and a cylindrical outer surface 56 generally concentric to the surface of the cylinder bore 42. Clamping wedges 57 have a generally trapezoidal cross section with a flat outer wall 58, parallel side walls 59, parallel top and bottom surfaces 61 and 62, respectively, and an inclined wall 63 opposite the outer wall 58. The clamping wedges are circumferentially equally spaced about the lower edge of the liner, and an elongated clamping stud 64 has a threaded lower end 65 received in a threaded opening 66 in top wall 61 of each wedge and an enlarged exteriorly threaded head 67 received in an unthreaded counterbore 68 in an opening extending through the cylinder head flange 45. A locknut 69 engages the threaded head 67 so as to engage the surface of the flange.

The cylinder head 43 and affixed liner 44, with the wedges 57 loosely positioned on the lower end of the liner, is inserted into the bore 42, and the head flange 45 is clamped onto the block 41 by the crab blocks 48. Then the studs 64 are rotated to draw up the wedges 57 upward against the bore wall and the exterior surface 56 of the liner to clamp the lower end of the liner in operative position, and the locknut 69 threaded down to the flange 45 to retain the stud in its adjusted position.

We claim:

1. In a diesel cylinder engine, in combination with a diesel engine block having a generally cylindrical bore therein, a diesel cylinder head adapted to be secured to the block, a cylinder liner adapted to be secured to the cylinder head and received in the bore, said liner having a generally cylindrical exterior surface and an interior cylindrical surface to receive a reciprocating piston therein, a plurality of clamping wedges circumferentially equally spaced about said liner and adapted to be positioned between the exterior surface of the cylinder liner and the surface of the bore adjacent the lower end of the liner to retain the liner in its operative position in the bore, said clamping wedges each having a surface generally paralleling the surface of said bore and an oppositely disposed inclined surface engaging the exterior surface of said liner, and a clamping bolt having a threaded end engaging a threaded opening in and actuating each wedge.

2. In a diesel cylinder engine as set forth in claim 2, in which said clamping wedges have a generally arcuate configuration to conform to the facing surfaces of said bore and said liner.

3. In a diesel cylinder engine as set forth in claim 1, in which said clamping wedges have a generally trapezoidal configuration, and the clamping bolts extend downwardly to their corresponding wedges from the exterior of the cylinder head.

4. In a diesel cylinder engine as set forth in claim 3, in which said cylinder head has a radial flange at its upper end adapted to be clamped to the cylinder block and having a plurality of unthreaded counterbored openings, and said clamping bolts extend through said flange and have enlarged heads received in said counterbores and exposed at the upper surface of said cylinder head.

5. In a diesel cylinder engine as set forth in claim 4, in which said clamping bolts extend downward between the liner and the wall of said bore.

6. In a diesel cylinder engine as set forth in claim 4, in which said cylinder liner has an exterior cylindrical surface facing the cylindrical surface of said bore, and each clamping wedge has a generally flat surface adapted to engage the surface of the bore and an oppositely disposed inclined surface adapted to engage the exterior surface of said liner.

7. In a diesel cylinder engine as set forth in claim 4, in which each clamping bolt has an exteriorly threaded enlarged head, and a locknut threadingly engaging said threaded head.

8. In a diesel cylinder engine, in combination with a diesel engine block having a bore therein, a diesel cylinder head adapted to be secured to the block, a cylinder liner adapted to be secured to the cylinder head and received in the bore, said liner having an exterior surface and an interior cylindrical surface to receive a reciprocating piston therein, a plurality of clamping wedges circumferentially equally spaced about the liner and adapted to be positioned between the exterior surface of the cylinder liner and the surface of the bore adjacent the lower end of the liner to retain the liner in its operative position in the bore, each clamping wedge including a surface generally paralleling the surface of the bore and an oppositely disposed inclined surface engaging the exterior surface of said liner, said wedges having a generally arcuate configuration to conform to the facing surfaces of said bore and liner, said liner having a reduced diameter lower portion terminating in a radial flange, and at least a discontinuous inclined surface at the transition between said liner and reduced lower portion, said clamping wedges positioned to engage said inclined surface, and a clamping bolt adapted to actuate each wedge.

9. In a diesel cylinder engine as set forth in claim 8, in which said wedges each have a threaded opening receiving the threaded end of said clamping bolt, and said flange having a counterbored opening to receive an enlarged head of said clamping bolt.

10. In a diesel cylinder engine as set forth in claim 9, in which each bolt is manually rotated to project its associated clamping wedge against the inclined surface and the cylinder bore through the threaded engagement between the bolt and wedge.

* * * * *

UNITED STATES PATENT OFFICE
CERTIFICATE OF CORRECTION

PATENT NO. : 4,187,767
DATED : February 12, 1980
INVENTOR(S) : Robert H. Jones, Jr. & Richard B. Jones It is certified that error appears in the above-identified patent and that said Letters Patent are hereby corrected as shown below:

Column 4, line 42 ( Claim 2, line 1 )

change " claim 2 " to read -- claim 1 --

Signed and Sealed this

Third Day of February 1981

[SEAL]

Attest:

Attesting Officer

RENE D. TEGTMEYER

Acting Commissioner of Patents and Trademarks